Nov. 7, 1961  C. R. FINE  3,008,011
CONTROL-TONE PERSPECTIVE SOUND SYSTEM
Filed March 7, 1955  5 Sheets-Sheet 1

INVENTOR.
C. Robert Fine
BY Darby & Darby
HIS ATTORNEYS.

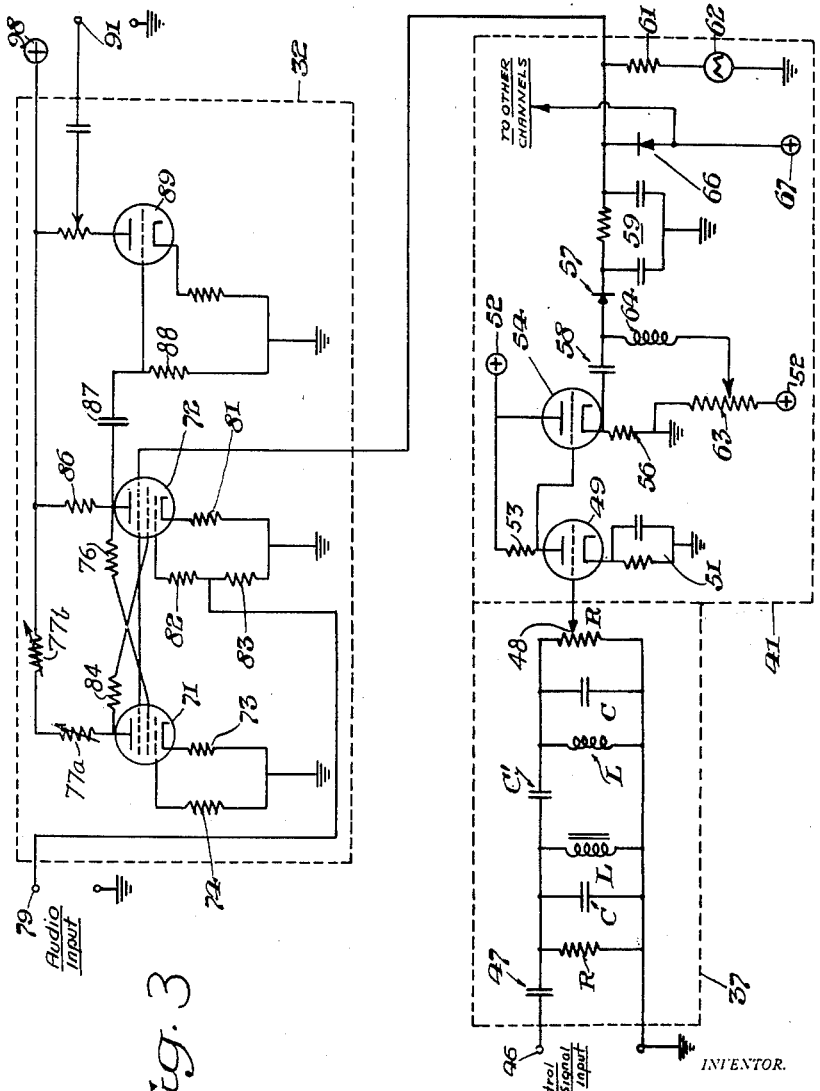

Nov. 7, 1961 C. R. FINE 3,008,011
CONTROL-TONE PERSPECTIVE SOUND SYSTEM
Filed March 7, 1955 5 Sheets-Sheet 3

INVENTOR.
C. Robert Fine
BY Darby & Darby
HIS ATTORNEYS

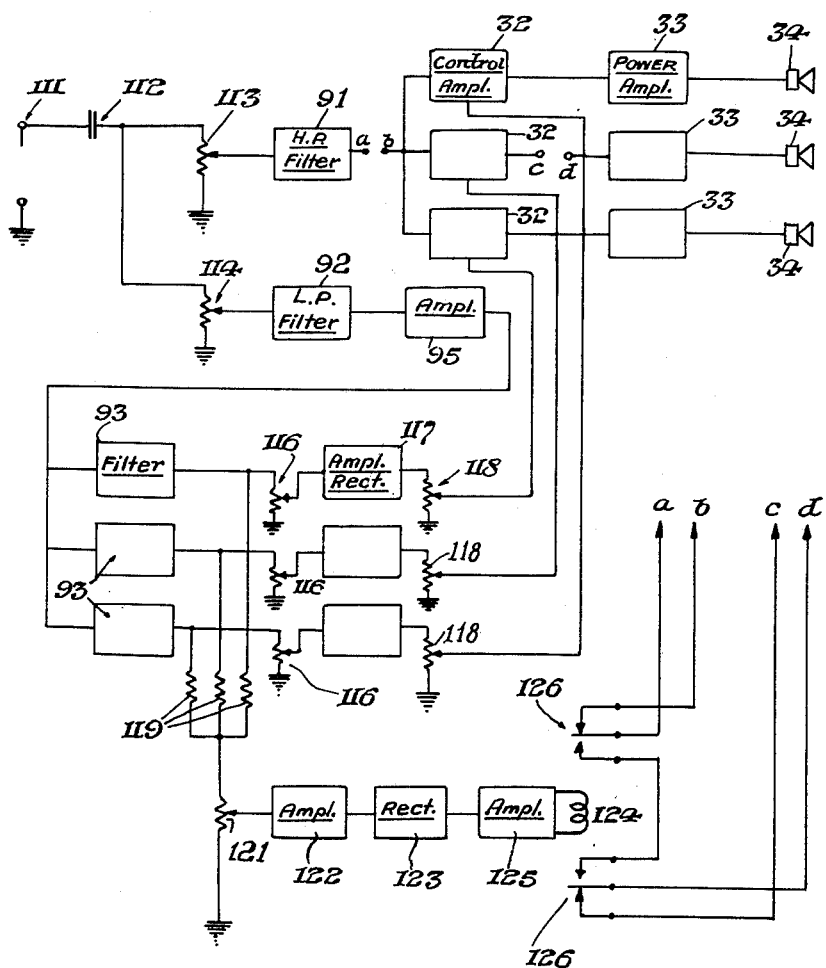

United States Patent Office 3,008,011
Patented Nov. 7, 1961

3,008,011
CONTROL-TONE PERSPECTIVE SOUND
SYSTEM
Clarence Robert Fine, Tomkins Cove, N.Y., assignor to
Perspecta Sound, Inc., New York, N.Y., a corporation
of New York
Filed Mar. 7, 1955, Ser. No. 492,609
2 Claims. (Cl. 179—100.1)

The present application is in part derived from my application, Serial No. 384,897, filed October 8, 1953, now U.S. Patent 2,714,633, issued August 2, 1955, and in part derived from my application Serial No. 440,924, filed July 2, 1954, now U.S. Patent 2,802,061 issued August 6, 1957 and is a continuation-in-part of both said applications.

The present invention relates to systems, apparatus and processes for the control of sound-reproducing devices and is more particularly concerned with such systems, apparatus and processes for the production of perspective or three-dimensional effects in the reproduction of sound.

At the present time, the motion picture industry is extremely active in the development and promotion of various systems for the production of three-dimensional motion pictures, particularly of the stereoscopic type. Systems are also being put into use, which, while not properly stereoscopic in character, have a three-dimensional effect by the use of extremely wide, curved screens which give the viewer an impression of depth. As a concomitant of such systems it is highly desirable to produce sound effects accompanying such motion pictures which also give the effect of a third dimension and particularly the effect of varying the origin of sound in correspondence with the action on the motion picture screen. Such effects may be termed perspective sound effects. The increased interest which can be obtained by giving the audience the feeling that the origin of sound varies in correspondence with the action occurring on the screen greatly enhances enjoyment and attracts greater attendance.

In the past, systems of this character have been utilized either with so-called three-dimensional motion pictures or with ordinary "flat" motion pictures for the above purpose. However, former known systems have the disadvantage of requiring either a separate multitrack recording in association with the usual sound motion picture film or special multiple sound tracks on the motion picture film, each track providing a separate audio signal to a respective sound reproducer. Such systems have been complicated, in requiring multiplied separate recording systems, with duplication of apparatus both at the recorder and at the record pickup or reproducer. Also, they have prevented full compatibility of the motion pictures thus produced in the sense that special films and/or records are required which can be utilized only in a motion picture theater equipped with proper apparatus and cannot be used with the conventional motion picture theater projection apparatus. This, of course, is a disadvantage where wide circulation of a motion picture print is desired, requiring one printing for inadequately equipped motion picture houses, and another different print for specially equipped houses.

It is the object of the present invention to provide a sound recording and reproducing system and apparatus therefor for producing a controlled three-dimensional or perspective effect, which is useful with any form of recording medium and pickup and which provides a record fully compatible and interchangeable with conventional records and usable on conventional reproducers of the same type even though not equipped for the perspective effect.

It is a further object of the present invention to provide such apparatus using but a single track of a recording medium.

Another object of the invention is to provide means for automatically converting a perspective sound-reproducing system into a conventional system upon failure of any important part of the apparatus.

A further object is to provide a system and apparatus therefor adapted to use interchangeably perspective sound and conventional recordings on the same apparatus without change or use of adapters or converters.

The present invention provides a system which reproduces sound controllably so as to appear to be emanating from different directions and/or distances, as desired. The reproducing system incorporates a plurality of differently located loud speakers or similar sound reproducers, each of which is supplied with the same electrical sound signals picked up from a record of suitable type. Apparatus is provided using only the same record and the same sound track on such record, by which the output of each of these reproducers is individually controlled as desired, by the action of control signals, according to which the different perspective effects desired can be obtained. The record produced is fully compatible and may be reproduced by conventional apparatus without producing perspective effects, or by special perspective-producing apparatus forming part of the invention.

According to another feature of the present invention, special means are provided to prevent any harmful effects from possible interaction between control signals. It will be understood that the normal non-linearities present in electronic circuits and especially in electron tubes may provide an intermixing or intermodulation among signals. When this happens, difference-frequency signals are produced, which can cause effects which are harmful and undesired. The present invention provides means for preventing such effects.

According to another aspect of the present invention, the circuit of the invention includes special means for avoiding other disturbing effects. For example, if action in a motion picture is momentarily confined to the center of the screen, the present system provides sound reproduction correspondingly at a center location. Should the apparent source of sound suddenly broaden out to cover the entire screen, as may be the case for background sound effects, normally this would mean that all left, center and right loudspeakers would become suddenly energized, instead of merely the center speaker which was previously energized. As a result, undesirable blasting may occur due to this tripling of the sound energy reproduced. According to a feature of the present invention, this is avoided by automatically causing the total energy to be distributed among the speakers at less than the former amplitude from a single speaker. The total energy may be kept constant, although this is not necessarily the case. In any event, the troubling blasting effect is avoided by reducing the energy level of each speaker when it is used in conjunction with others, as compared to its energy level when it is used alone.

The present invention also provides convenient and special circuits for easily attaining the desired control of the various speaker inputs in an accurate and simple manner.

A further feature of the present invention resides in providing a means for and method of overcoming the normal delays incident to control action in the circuit, so as to avoid lag of the control action behind the audio signal.

According to another feature of the invention, means are provided in connection with the "auto-switch" circuit for avoiding accidental and unintentional switching from perspective to flat sound reproduction or vice versa, such as may be caused by noise or similar pulses, or by short omission of control signals, as in splices.

The circuit of the present invention is intended to cooperate in conjunction with a record having recorded thereon a single track having both audio and control components. The audio components are electrical versions of the sound to be reproduced, as by speakers. The control components are separate tones or carriers, in number equal to the number of speakers or speaker groups to be used. Illustratively, it will be assumed that there are left, center and right speakers, so that three control carriers will be assumed. These carriers are adjusted in amplitude during the recording process so that each represents the desired output volume of its respective speaker. The frequencies of these carriers are preferably outside the range of normal reproduction, and to assure that these carriers will not interfere with reproduction by conventional apparatus, they are recorded with a level at least 18 db (and preferably of the order of 26–40 db) below the level of the audio components, to avoid both accidental audible reproduction of the control carriers, and also their intermodulation with the audio signal due to possible non-linearities in the system.

Other objects, advantages and features of the present invention will become more fully apparent from the following description of preferred embodiments thereof, taken in conjunction with the appended drawings, in which:

FIGURE 3 is a schematic circuit diagram of the filter, rectifier and control amplifier portions of the system of FIGURE 2.

FIGURE 6 is a schematic block diagram of an improved form of reproducing apparatus according to the present invention.

Referring first to FIGURES 1 to 4, FIGURE 1 illustrates a system for producing recordings according to the present invention. As indicated above, the present invention provides in association with the usual sound or audio recording, a recording of control signals on the same sound track for providing the desired perspective effect. The recording medium may be magnetic, optical, dielectric or mechanical in character, as desired. Thus for magnetic recording, the recording track may be a strip of magnetizable material supported upon a suitable tape, such as the conventional magnetic recording tape. If optical, it would be a separate visual record on a film and, for example, might be of the variable-area or variable-density type utilized for the sound track of motion picture films. If mechanical, it may be embossed or engraved grooves on a suitable medium, for lateral or hill and dale recording.

Figure 1:
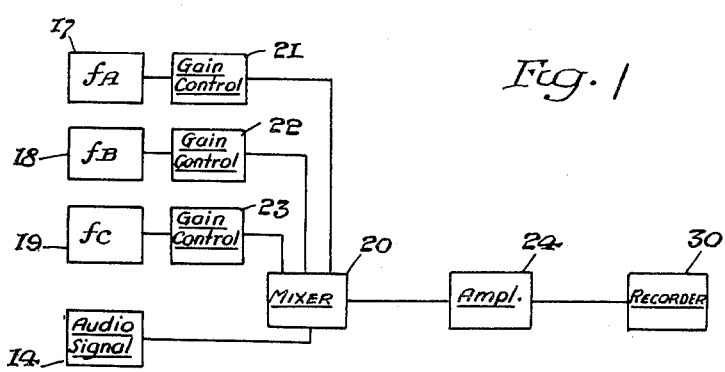
FIGURE 1 is a schematic block diagram of apparatus for producing a single-track sound and control recording according to the present invention.

As shown in FIGURE 1, the recording involved is produced by a recorder 30 arranged in well known manner to cooperate with the track of the recording medium. The recorder is supplied with audio signal from any source 14 of intelligence to be used, through a mixer 20 and an optional amplifier 24, so that on the recording track there is produced a conventional recording of the audio signal from source 14. Such audio signal may conveniently be produced by a microphone picking up a live scene or any other suitable or desired source of sound or other signals.

In addition, there are provided a plurality of control signal oscillators 17, 18 and 19 indicated in this instance and for illustrative purposes only as three in number. It will be understood that any desired number of control signals may be utilized in this system, determined by the number of controlled channels to be used. In general, there will be one control signal source for each controlled channel, such controlled channel comprising one or more sound reproducers fed by a common audio signal for producing identically varying outputs. As indicated in FIGURE 1, each of the control signal sources 17, 18 and 19 produces a respective output of an individual frequency $f_A$, $f_B$ and $f_C$. By way of illustration, these frequencies may be 11, 12 and 13 kilocycles per second respectively or any other conveniently controlled, translated and recorded frequencies with the audio components limited to below 10 kilocycles per second.

Each of the control signal sources 17, 18 and 19 supplies its output to an individual controller 21, 22 and 23 whereby the outputs of the individual control signal sources 17, 18 and 19 are adjustably controlled in amplitude over the desired range, and these outputs are combined with the audio signal component into a single composite signal by a mixer 20 which is supplied through an optional amplifier 24 to the recorder 30. Individual monitoring meters may be coupled to the controllers 21, 22 and 23 to indicate the output level of the respective control signals supplied thereto. The recorder 30 impresses its composite signal upon the track of the recording medium. In this way, a single recording on a single medium is provided, with two components, one being the normal audio or intelligence signal to be reproduced and the other being a composite control signal whose components are the respective different-frequency control signals, each individually adjusted in amplitude as desired.

Figure 2:
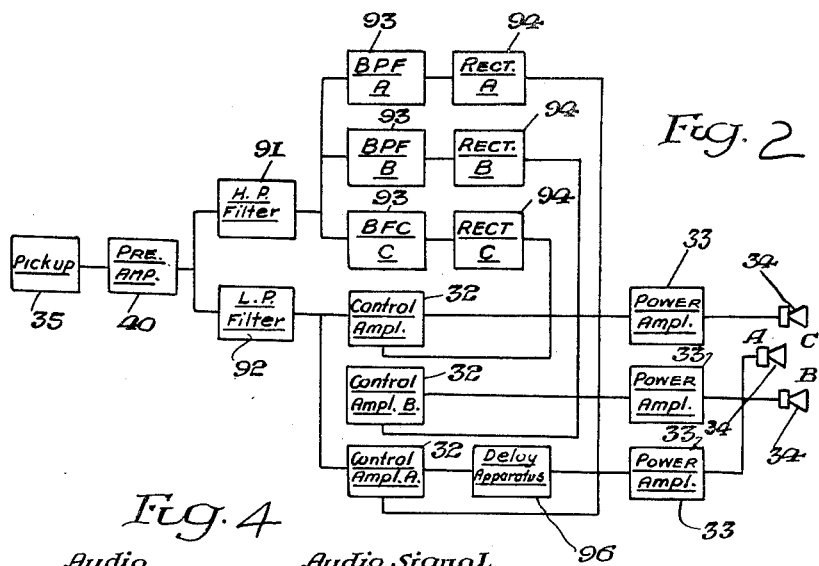
FIGURE 2 is a schematic block diagram of a reproducing system for the apparatus illustrated in FIGURE 1.

At the reproducer location, as illustrated in FIGURE 2, a pickup 35 cooperates with the single track of the recording medium to reproduce the signal recorded on the track. This signal is amplified in a suitable preamplifier 40 whose output is supplied to both a high pass filter 91 and a low pass filter 92 which separates the control signals from the audio or intelligence signals in well-known manner. The output of low pass filter 92 is applied identically to a plurality of control amplifiers 32, each feeding a respective power amplifier 33, which in turn energizes a respective sound reproducer 34, such as a loud speaker or the like. In this way, a replica of the same audio signal provided by source 14 of FIGURE 1 is applied to all of the sound reproducers 34. Those reproducers are desirably positioned at different locations about the listeners' position. Thus, in an auditorium, theater or large room, the reproducers 34 would be distributed at the center and on either side of the area from which it is desired that the reproduced sound emanate.

For the purpose of providing the desired perspective sound effect, according to the present invention the outputs of the reproducers 34 are individually controlled by and in accordance with the respective control signals. For this purpose the composite signal derived from high pass filter 91 is fed to a plurality of filters 93, each adapted to pass a respective one of the several control signal frequencies. Thus upper filter 93 is part of control channel A and passes only the control signal frequency $f_A$. Similarly, the other filters 93 form parts of B and C respectively, and pass control signal frequencies $f_B$ and $f_C$ respectively. The filters 93 have their outputs coupled respectively to rectifiers 94 which convert the respective control signals of frequencies $f_A$, $f_B$ and $f_C$ into corresponding respective unidirectional control signals each preferably proportional in amplitude to its alternating control signal. These unidirectional signals are in turn supplied to the control amplifiers 32 of the respective channels A, B and C to variably control the amplitudes of the outputs of these control amplifiers, so as to correspondingly control the reproducer outputs.

The operation of this system will be more readily apparent from an illustrative example of one of its fields of usefulness, although the invention is not limited thereto. In present wide-screen and three-dimensional motion pictures the movement of visible action on the screen should desirably be accompanied by a corresponding apparent movement of sound emanating from such action. Thus, if an actor moves across the screen, his voice should appear to move with him, to enhance the audience's enjoyment and increase the illusion of actual movement. Similarly, as an actor (or source of sound or music) apparently moves away from the audience, the sound should diminish in intensity. As another example, in an orchestral performance, sound from different sections of the orchestra should appear to emanate from different sides of the audience. All these effects are readily produced by the present system, since, although audio signals of identical sound content or intelligence are supplied simultaneously to all reproducers, the actual intensity of sound from each reproducer may be individually adjusted to give the desired overall effect.

In actual use, an operator adjusts the controlling mixers 21, 22, 23 as the program is recorded, to provide the proper control signal amplitudes synchronously with the program, so that upon reproduction as in FIGURE 2, the perspective effect desired is produced.

While any conventional circuit adapted to perform the functions above could be used for filters 93, rectifiers 94, or amplifiers 32, FIGURE 3 illustrates one form of such circuit found to be very useful in the present system.

FIGURE 3 illustrates any one of the channels A, B or C, taken for illustrative purposes to be channel A, and the dotted rectangles labelled 37, 41 and 32 form respectively the filter 93, the rectifier 94 and the control amplifier 32. The input control signal from the pickup 35 is fed to terminals 46 of the filter 37. This filter is generally of the pi type having two shunt arms each composed of resistance R, capacitance C and inductance L, and a series arm formed by capacitance C′, the pi arrangement being coupled to the input terminals 46 through a coupling condenser 47. The output arm resistor R may be in the form of a potentiometer whose variable tap 48 is coupled to the control grid of a triode amplifier 49 having its cathode connected to ground through a parallel-connected RC circuit 51, and its anode connected to a source 52 of positive potential through a load resistor 53. The anode of tube 49 is directly coupled to the control grid of a second tube 54 whose cathode is grounded through a cathode output resistor 56 and whose anode is coupled directly to the positive potential source 52. The cathode of tube 54 is coupled to a rectifier 57 through a coupling condenser 58, the rectifier 57 having a resistor-condenser filter 59 to ground for bypassing the alternating current components of its rectified output, which is coupled to an output resistor 61 connected to ground through a current meter 62.

As thus far described, the filter 37 selects the control signal of frequency $f_A$ for amplification by tubes 49 and 54, the latter operating as a cathode follower. This amplified control signal is then rectified by rectifier 57 to appear as a correspondingly varying unidirectional signal across resistor 61. In addition, an adjustable positive bias is supplied to the junction between rectifier 57 and its input condenser 58 by means of a potentiometer 63 and an isolating choke 64. This adjustable bias voltage determines the initial value of the unidirectional signal appearing across output resistor 61 in the absence of control signal and in effect provides a range adjustment for the reproduced sound. Also connected across resistor 61 through a further rectifier 66 is a positive potential source 67 common to all channels. This is selected to provide the same current to the resistors 61 of all channels, to provide a common zero signal level condition for the control amplifier individually adjustable by range adjustment 63. Source 67 may be made adjustable, so as to provide a type of ganged control for the output level of all channels simultaneously, each channel also having its individual adjustment 63.

The arrangement of rectifiers 57 and 66 is of especial advantage in providing isolation between channels even through using common power supplies. Thus, current from source 52 cannot pass to source 67 or to other channel circuits, because of the large backward impedance of rectifier 66. Similarly, no current from source 67 can pass to source 52 because of the backward impedance of rectifier 57. Therefore the adjustment of any one channel has no effect on other channels.

The control amplifier 32 comprises a pair of amplifier tubes 71 and 72 preferably of the multiple grid type. Tube 71 has its cathode connected to ground through a cathode resistor 73 and its first grid is also connected to ground through a resistor 74. The second grid of tube 71 is connected through a resistor 76 to the anode of the other tube 72. The third grid of tube 71 is directly connected to the corresponding third grid of tube 72 and both of them are connected to the high potential terminal of rectifier output resistor 61. The anode of tube 71 is connected through variable load resistances 77a, 77b to a positive potential source 98. Tube 72 has its cathode grounded through a cathode resistor 81 and its first grid is also connected to ground through a voltage divider formed by resistors 82 and 83 whose junction is connected to the input terminal 79 to which the audio signal is supplied from filter 91 of FIGURE 2. The second grid of tube 72 is connected through a resistor 84 to the anode of the first tube 71. The anode of tube 72 is connected through a load resistor 86 to the positive potential source 98. This crisscross-connected two-tube circuit operates as a variable gain amplifier whose amplification is determined by the bias on the third grids as supplied from the rectifier load resistor 61. In this way, the unidirectional voltage appearing across resistor 61 determines the amplification of the audio signal applied to terminal 79. The slope of the gain characteristic of the circuit of tubes 71, 72 is not linear, so that the adjustable bias provided by range adjustment 63 determines the actual range or change in amplitude of audio which a given amplitude of control signal will produce.

This variably controlled output of tube 72 is supplied through a coupling condenser 87 and an input resistor 88 to a further amplifier state 89 of conventional form whose output is supplied to the terminal 91 coupled to the input of power amplifier 33 of FIGURE 2.

It will be appreciated that by this circuit the gains of the respective control amplifiers 32 are individually determined by the amplitudes of the respective control signals so as to govern the sound output level from the respective reproducers 34. In this way, by properly determining the amplitudes of the control signals set into the recording system of FIGURE 1, any desired sound arrangement or perspective effect can be produced by the reproducing system of FIGURE 2. Thus, if the reproducers of A, B and C represent respectively the left, center and right loud speakers in a theater, by properly producing the amplitudes of control frequencies $f_A$, $f_B$ and $f_C$ the sound may seem to come from the left, center or right portions of the auditorium. Thus with control signal $f_A$ at maximum amplitude and control signals $f_B$ and $f_C$ at the zero amplitude, the sound will issue only from loud speaker A, with full volume, and it will appear to come from the position of the loud speaker A, such as the left side of the theater. By varying the amplitude of the control signal $f_A$ varying distance effects can be obtained and the sound may appear to be closer or farther as desired. Similarly, by having control signal $f_C$ of maximum amplitude and the others at zero and with reproducer C at the right side of the theater, the sound comes only from the right side. By gradually decreasing the amplitude of $f_A$ as that of $f_C$ increases, the sound may be made to shift from left to right. The center channel can be coordinated with the others to give intermediate effects. It will therefore be obvious that by controlling the relative amplitudes of the respective control signals, the resultant sound reproduced can be made to shift in direction and may be made to appear to come closer or go farther from the listener.

By use of the present system, the normal effect of a motion picture, for example, can be greatly enhanced. As actors speak from the left or right side of the screen, the sound can shift accordingly. As actors move forward or back on the screen, the volume of sound can vary correspondingly to give an auditory illusion corresponding to the visual effect, thereby greatly enhancing the realism and enjoyment of the observer.

It will be understood that the above system and other systems described herein below are in no way limited to use with motion pictures or in motion picture systems. On the contrary, such systems can be utilized wherever perspective sound reproduction is desired. For example, in recording and reproducing orchestral compositions and particularly symphonic compositions, listening pleasure can be increased by the addition of perspective sound effects. Thus, where in the customary symphonic orchestra different sections of the orchestra are usually positioned at different locations, by the use of perspective sound effects according to the present invention and with a plurality of sound reproducing devices, portions of the composition emanating from a particular section of the orchestra can be made to appear to come from a direction corresponding to the location of that section of the orchestra. Thus if the string section is on the right side and other sections such as the woodwinds on the left, portions of the composition in which the strings predominate can be made to appear to emanate from reproducers on the right side of the room and, similarly, the woodwind sections of the composition can be made to appear to emanate from the left side, thereby giving the illusion of directional and perspective effects which will enhance the customary "flat" reproduction. Also, special or unusual sound effects can be created at will. Eerie effects can be obtained, for example, by having the apparent sound source travel around a room or theater, from side to side, or front to rear. This can be used as special sound effects in the theater or for other purposes.

It will be also understood that the recording medium used in any of the forms of the present invention need not be in the form of a tape or film, but can be any other suitable recording medium adapted to produce a record of both the intelligence and control signals upon a single recording medium, which might be a magnetic tape, a magnetic wire, an optical film such as motion picture film, a grooved disc, a grooved cylinder, a grooved tape or the like, it merely being required that the recording medium and recorder have the adaptability of providing an actual recording of the combined frequency band of the audio signal of the intelligence and the control signals.

Figure 4:
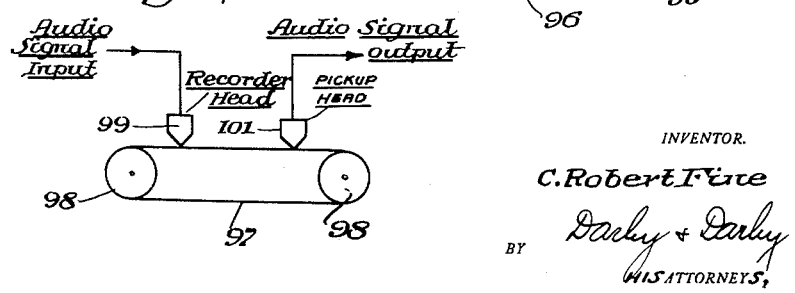
FIGURE 4 is a schematic diagram of one form of reverberation apparatus.

The output of channel A and its control amplifier 32 is supplied to a delay apparatus 96 and thence to a respective power amplifier 33 and reproducer 34. The purpose of this delay apparatus 96 is to provide a time delay for the audio signal passing through channel A which, upon reproduction, produces a reverberation effect providing a further enhancement of the perspective sound effects produced. The delay apparatus 96 may be as illustrated in FIGURE 4, comprising an endless magnetic tape loop 97 continuously rotated over reels or pulleys 98 at constant speed. The audio signal output from control amplifier 32A is supplied to a recorder head 99 which impresses a recording of the signal on the tape 97. A pickup head 101 picks up the recorded signal and converts it into the same audio signal, but after a time delay corresponding to the length of time taken for any one spot of the tape to travel around the loop from the recorder head 99 to the pickup head 101. This time may, of course, be made adjustable by suitable means, as by varying the speed of the tape 97 or the separation between the heads 99 and 101. The reproducer 34A may be centrally located if desired, and produces a reverberation effect by being supplied with the time delayed version of the intelligence signal.

It will be understood that as many channels and corresponding spatially distributed reproducers may be used as desired. Usually, there will be center, left and right reproducers, for example, all on stage or behind the motion picture screen of a theater, which may be supplemented by left and right side and even rear reproducers in the auditorium itself. The reverberation channel may also be multiplied by use of several spatially separated reproducers individually controlled. In the usual case, four channels suffice, one being for reverberation and the others for spatial effect as above.

One important feature of the system just described is its complete compatibility with conventional systems utilizing a single pickup operating a single reproducer. For this purpose the inputs to the mixer 20 are so arranged that the control signals have an amplitude markedly less than that of the audio signal. An amplitude ratio of 18 to 30 db may be usefully employed. At the reproducer of FIGURE 2 this relative diminution of the control signals can be made up by amplifiers incorporated in either the high pass filters 91, the band-pass filters 93 or the rectifiers 94 to provide a useful level of control signal output from rectifiers 94. However, in a conventional reproducer, the control signals will be substantially undetectible in the reproduced output because of their relatively low amplitude, when picked up and amplified in the conventional apparatus in which there is substantially no selectivity of amplification as between different frequencies within its range. Furthermore, conventional sound systems rarely have the capacity to amplify or reproduce frequencies above eight to ten kilocycles and in such systems, the control signals will be completely suppressed and will have no effect.

Accordingly, by the present system a recording can therefore be made which appears to be of completely conventional form and when reproduced on conventional apparatus conveys the conventional results. The same recording, however, since it contains the control frequency components, can be performed on special perspective sound equipment such as shown in FIGURE 2, and will produce the full enhancement offered by perspective sound. This can be extremely important, for example, in motion picture exhibition in which for economic reasons the smaller theaters comprising, of course, the larger number of theaters, may not be able to install perspective sound equipment as larger theaters can. The motion picture producer when using the present system need not concern himself over whether or not a particular theater has perspective sound equipment, since the same motion picture print having but a single sound track can be used in all theaters, those without perspective sound equipment reproducing conventional sound, and those with perspective equipment producing perspective sound effects.

In motion picture work particularly, it is often disadvantageous to record on the film and to reproduce higher frequencies in the audio range, and conventionally the optical sound track on the film contains no frequency components higher than 7500 cycles. In such case the control frequencies may be made to have values in the sub-audible range of the amplifying reproducing system, which conventionally cuts off all signals below 70 cycles. Accordingly, control frequencies between 30 and 50 cycles may advantageously be used, which will not be reproduced by the conventional amplifiers and reproducing equipment used but which can be preamplified and separated from the intelligence signal without difficulty. Here again, full compatibility is obtained by lowering the control signal level as recorded to nearly the threshold of hearing in the conventional reproducing system.

Figure 5:
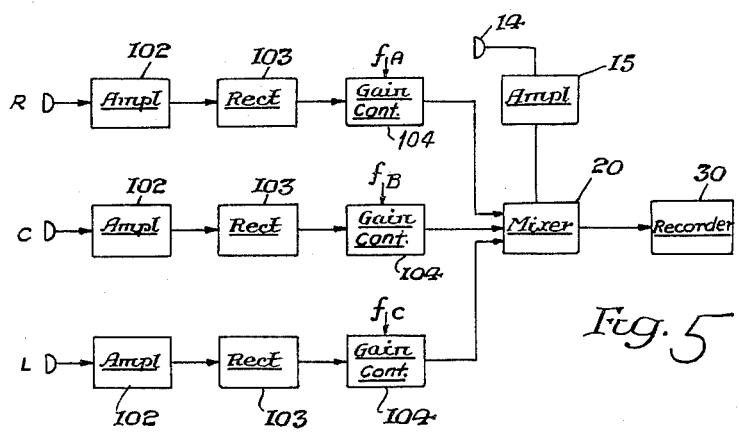
FIGURE 5 is a schematic block diagram of an automatically controlled recording apparatus for single track systems.

The above systems have been based upon the manual adjustment of the amplitudes of the control signals to produce desired effects. This would usually be done by manually operated gain controls 21, 22 and 23 during the recording of the audio signal, to produce control signals corresponding to the desired effects and synchronized with the audio signal. FIGURE 5 illustrates an automatic control system for the control signals during the recording. Thus, for example, if the audio signal represents a dramatic production or an orchestral production occurring over a considerable area, separate pickups such as microphones R, C and L may be located respectively at the right, center and left portions of the program area. The signals thereby picked up may be amplified by respective amplifiers 102, rectified by rectifiers 103 and supplied to adjustable gain control amplifier circuits 104 which are also supplied with the respective control signals $f_A$, $f_B$ and $f_C$. Th rectifiers 103 and control amplifier circuits 104 may be of the type illustrated in FIGURE 3 or may be of other conventional types, by which the output of control frequency has an amplitude determined by the average microphone output. In this way, the average intensity of sound picked up by each of the microphones R, C and L produces a respective control signal of corresponding amplitude. At the same time a further pickup 14' such as a microphone, picks up the audio signal which is supplied through an amplifier such as 15 to a mixer 20 to which are also supplied the outputs of the control amplifier circuits 104. The mixer output then proceeds to the recorder 30 as before. By using the reproducing system of FIGURE 2 or those described hereafter, perspective effects are produced which correspond more closely to and simulate the original program, providing a directional and perspective output simulating that of the original program when the respective reproducers are arranged at the right, center and left of the room or theater in which the program is reproduced.

In systems of the above type, should there be a failure in any channel, the net effect would be a considerably distorted perspective sound effect. It would be much preferable to have a conventional flat sound system rather than such a distorted perspective sound system. According to a further feature of the present invention, illustrated in FIGURE 6, as applied to a sub-intelligence control frequency system, means are provided for automatically switching the present system over from a perspective sound system to a conventional sound system upon failure of any of the control channels or absence of all control signal. In this figure, elements which are the same as in previous figures have been given the same reference characters.

The composite audio and sub-audible control signal derived from a suitable pickup unit and/or amplifier, not shown, is applied to input terminal 111 from which it proceeds through a coupling condenser 112 to a gain control 113, supplying the high pass filter 91 which in turn feeds the control amplifiers 32, power amplifiers 33 and reproducers 34. Also coupled to the condenser 112 is a control signal amplitude control 114 at the input to the low pass filter 92, coupled through an optional amplifier 95 to the band pass filters 93 each adapted to pass a respective sub-audible control frequency. At the output of each filter 93 is an expansion control 116, coupled to an amplifier and rectifier 117, having a gain control 118 in its output for adjusting the level of the unidirectional control signal applied to the control amplifiers 32. Also coupled to the outputs of filters 93 through respective isolating resistors 119 is a carrier alarm sensitivity control 121 supplying an amplifier 122 whose output is supplied to a rectifier 123 controlling a relay 124 through amplifier 125. As will be seen, the relay contacts 126 serve to interrupt the line at the points $a$, $b$ in the output of the intelligence-passing filter 91 and connect the output of the intelligence passing filter 91 directly to the center power amplifier channel 33, supplying the center reproducer 34. The other reproducers 34 are then not energized.

Figure 7:
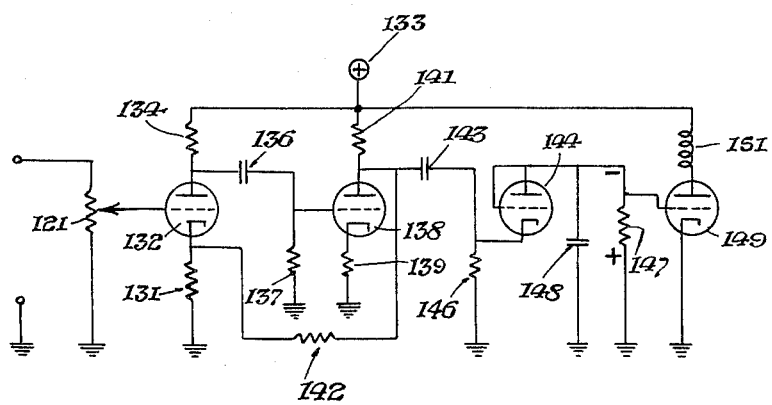
FIGURE 7 is a schematic circuit diagram of the fail-safe control circuit in the system of FIGURE 6.

The circuit of the amplifier 122, rectifier 123, amplifier 125 and relay 124 is shown in FIGURE 7. The sensitivity control or potentiometer 121 has its variable tap coupled to the grid of an amplifier tube 132 whose cathode is grounded through resistor 131 and whose anode is coupled to a positive potential source 133 through a load resistor 134. The anode of tube 132 is coupled by a condenser 136 and input resistor 137 to the grid of an amplifier tube 138, whose cathode is grounded through resistor 139 and whose anode is coupled to the source 133 through a load resistor 141. The anode of tube 138 is coupled to the cathode of tube 132 through a negative feed-back resistor 142, preventing oscillation, and is also coupled through a condenser 143 to the cathode of a diode rectifier 144 by way of an input resistor 146. The anode of diode 144 is coupled to ground through a load resistor 147 having a shunt condenser 148. The load resistor 147 is coupled between the cathode and grid of a relay control tube 149, having the relay winding 151 connected between the source 133 and its anode.

The resistors 119 serve to combine the outputs of filters 93 into a composite control signal appearing across the sensitivity potentiometer 121. Where desired, the control 121 could be coupled directly to the output of filter 92 or amplifier 95; however, it is more desirably coupled as shown so that failure of any part of the circuit of filter 92, amplifier 95 or filters 93 may actuate the fail-safe system. The amplifier 122 formed by tubes 132 and 138 increases the level of this composite control signal which is then rectified by the rectifier 144 and applied to the relay tube 149. The relay tube 149 is normally cut off, leaving the relay de-energized. In this position, points $a$ and $b$ are connected together by upper relay contacts 126, and points $c$ and $d$ are similarly connected by lower contacts 126. Should the composite control signal diminish below a predetermined value determined by the setting of the sensitivity control 121, the voltage developed across the rectifier 147 will diminish, thereby reducing the negative bias for tube 149 and causing current to be drawn through the relay winding 151 to actuate the relay. Upon energization of relay 124, its contacts open $a$ and $b$, open $c$ and $d$, and connect $a$ to $d$, thereby supplying audio only to the center channel power amplifier 33, cutting out all other channels and control amplifiers 32.

Since during normal operation there would always be at least one reproducer in operation requiring at least one control signal to be of appreciable and more than minimum amplitude during such normal operation, the relay 124 is normally kept deactivated, permitting normal perspective sound operation. Should any one of the control signals fail, or be absent when it should be present, or should any of the control channel circuits fail, the composite control signal will diminish, resulting in control action whereby the audio input of the three variable-gain control amplifiers 32 is cut off from intelligence-passing filter 91 and is supplied solely to the center channel power amplifier 33, thereby resulting in flat reproduction during the period that the control signal is of improper amplitude.

This fail-safe feature is of particular importance with respect to motion picture production. As indicated above, motion picture films having a sound track produced according to the present invention may operate either with a perspective sound reproducing system or a conventional reproducing system, interchangeably and compatibly. Conversely, it is important that a perspective sound system be able to reproduce interchangeably and compatibly motion picture films with conventional sound tracks as well as those with perspective sound tracks. The fail-safe feature just described assures this. For example, if a conventional news reel film or short subject is spliced onto the same film with a perspective sound track, upon projection of the conventional film portion, there will be a complete absence of control signal. This will automatically operate the fail-safe circuit to switch the reproducing system over to the conventional flat system using merely central reproducers. If desired, of course, instead of merely using the central reproducers, further relay contacts on relay 124 could supply the audio signal under these circumstances to all of the power amplifiers, producing uniform amplitude and distributing sound uniformly from all the reproducers. This, however, may be distracting where some of the reproducers are not located behind the screen as in conventional systems, but may be located within various parts of the theater.

It is to be noted that where sub-intelligence control frequencies are used, it is important to avoid interference between the intelligence signal and the control signals. The provision, according to one feature of the present invention, of a marked amplitude distinction between these signals, whereby the control signals are at least 18 and preferably about 40 db below the intelligence signal level, assists in avoiding such interference. Also, according to another feature of the present invention, interference is avoided by using pure sinusoidal control signals, thereby minimizing harmonic interference. In addition, changes in control signal are made only relatively slowly, to minimize side band effects, and intermodulation is avoided both by the wide level discrepancy and by use of substantially linear circuits.

Figure 8:
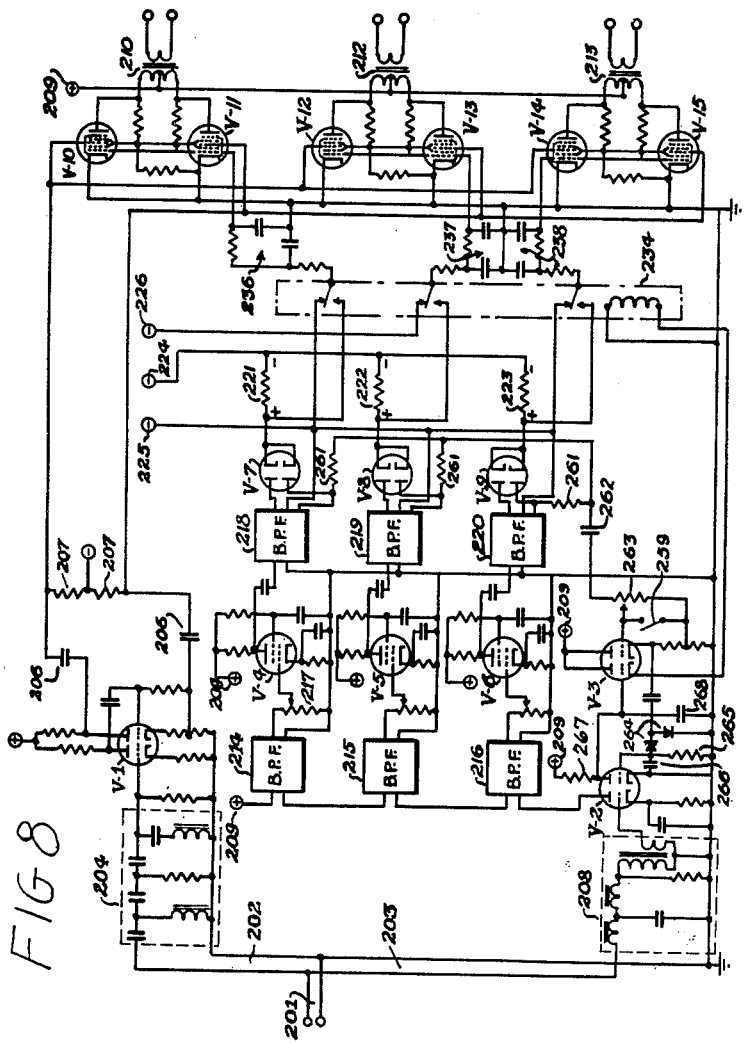
FIGURE 8 is a schematic circuit diagram of an improved circuit for use in the system in place of FIGURE 6.

The circuit of FIG. 8 may be used in place of that of FIGS. 6 and 7. In FIG. 8, the input terminals are shown at 201 to which are supplied the composite signals having audio components and control components, derived from the record by suitable pickup means. For illustrative purposes, the present invention is described with respect to three separate control signal components, assumed to be of 30, 35 and 40 cycles per second. The amplitude of each control signal designates the desired amplitude output from a respective loudspeaker. This can be either a direct relationship in which a larger amplitude of a control signal provides an increase in the output from its respective speaker, or may be an inverse relationship in which an increase in control signal amplitude results in a decrease in output signal.

The signal supplied to input terminals 201 is divided into two channels 202 and 203, which are respectively the audio signal channel and the control signal channel.

In the audio signal channel the composite signal is supplied to a high-pass filter generally designated by 204, and having a sharp cut-off at a frequency above the control signals, but below the lower limit of desired sound reproduction, such as, for example, 63 cycles per second. The filter 204 therefore suppresses the control signals and passes only the audio components. This audio component signal is supplied to a double section tube V–1, whose first section serves as a conventional voltage pre-amplifier having resistance-capacitance coupling to the second section, which serves as a phase inverter to provide a balanced push-pull output. This audio output is then supplied over coupling condensers 206 and balanced coupling resistors 207 in push-pull to the three balanced control amplifier stages formed by the pairs of tubes V–10, V–11; V–12, V–13; V–14, V–15. Each of these control amplifier tubes is of the multi-grid type, such as type 6BE6, having two separate input grids. The audio signal derived from preamplifier and phase inverter V–1 is supplied to one of these input grids of each of the two tubes forming each control amplifier stage, in push-pull fashion. The three pairs of control amplifier tubes are supplied in parallel so far as the audio signals are concerned, and their outputs appear individually at their respective output transformers 210, 211, 212.

The control signal channel 203 supplies a low-pass filter indicated generally at 208 having a cut-off frequency in the neighborhood of 55 cycles per second, which permits only the control signals to pass and effectively cuts off the audio signals. By way of example, this filter may be 3 db down at 55 cycles and have a cut-off slope of 18 db per octave.

These control signals are then supplied to a voltage preamplifier of conventional type formed by the left section of tube V–2, whose anode is supplied from a source 209 through a series circuit formed by the respective bandpass filters 214, 215, 216. These filters 214, 215 and 216 are tuned respectively to 30, 35 and 40 cycles per second, and are designed to have a flat topped acceptance band with steep sides. The acceptance band is of the order of 2 cycles per second in width in order to permit a slight variation in frequency of the control signal carriers without driving them beyond the acceptance range of the filters. It will be understood that the control signals are normally reproduced from a sound motion picture, and their frequency will depend upon the speed of travel of the sound motion picture as it passes the pick-up head. Unavoidable changes in speed of the projector, such as caused by change in power frequency or amplitude, may vary the control frequencies by as much as 2%, and the bandpass filters 214, 215, 216 are made to accommodate this situation. A flat top for the bandpass filters is also required in order to avoid distortion of the sound level as reproduced.

As indicated above, the level of the control signals as recorded is substantially below that of the audio signals, by from 18 to 40 db. This low level of control signals must be made up by considerable amplification before such signals can be utilized. This is partially done by the voltage amplifier stage comprising the left section of tube V–2. Such amplification necessarily means that any slight deviation of control signals from proper value may be greatly magnified and may result in distorted output unless proper precautions are taken to correct this condition. This requires a flat top for the filters. For example, each filter may have a pass band whose attenuation varies less than ½ db for ±1 cycle from the rated center frequency, and having a steep cut off with attenuation of over 20 db at ±5 cycles from the center frequency. The particular constructions and circuits of these filters is immaterial to the present invention, and any conventional forms of filter may be used. Preferably, these filters are formed by tuned transformers providing direct current isolation between input and output.

Each of the filters 214, 215, 216 leads to a separate control channel for its respective 30, 35 or 40 cycle control carrier. These control channels are the same except for their respective operating frequencies, and accordingly the 30-cycle channel (which may control the left speaker for example) will be described as illustrative of all of them.

The bandpass filter 214 supplies its output to an amplifier V–4 whose input circuit contains a gain control 217, permitting initial or manual setting of the level of the control channel to a desired level to take into account any individual variations in the control channel circuit, its loudspeaker, its power amplifier, or in the acoustical conditions of the auditorium in which audio reproduction is being effected.

Capacitively coupled to the output of the voltage amplifier V-4 is a further bandpass filter 218 which may be identical to filter 214 or may be individually different to obtain in conjunction with filter 214 the desired overall flat top bandpass characteristic discussed above, in which case, the input filter section 214 may be tuned sharply to the desired center frequency while the output filter section 218 may have its primary and secondary tuned above and below the center frequency to provide the required band width. The output filter section 218 has a balanced output connection which is supplied to a full wave rectifier V-7 having a load resistance 221 connected to a source 224 of negative bias potential. By way of illustration, source 224 may have a value of —18.5 volts. The center tap of the output of filter 218 is connected directly to a source 225 of negative bias which may, for example, have a value of —20 volts. In this way, the control carriers as a group are separated out of the composite audio-plus-control signal by filter 208, and the individual carriers are separated out by the respective filters 214–218, 215–219 and 216–220. Each control carrier is then converted by its rectifier to a direct current bias appearing across load resistor 221, which control bias opposes the fixed bias of source 224 to provide proper operating bias for the second input grids of the control amplifiers. Skipping for the moment the function of relay 234, and considering again illustratively the left channel (the upper control channel in the figure), the control bias appearing at the cathodes of V-7 is connected through the upper contacts of relay 234 (when the relay is energized), to a double resistance-capacitor delay network 236 and thereby in parallel to the second control grids of both amplifier tubes V-10 and V-11. Tubes V-10 to V-15, inclusive, are variable gain remote cutoff tubes (such as type 6BE6) and the control bias derived from V-7 serves to suitably control the gain of the tubes V-10 and V-11 to the audio signal supplied to their first input grids from the phase inverter V-1. Accordingly, the output from amplifier V-10, V-11 appearing at its output transformer 210 has an amplitude determined by the control bias from V-7, and hence determined by the original amplitude of the 30-cycle control carrier. This output is used to energize the left speaker, either directly or through a power amplifier, to thereby produce desirably controlled output from the left speaker.

The center and right channels similarly control the center and right speakers in correspondence with the 35-cycle and 40-cycle carriers.

Accordingly, in the system just described, the 30-cycle control signal, for example, will pass through the bandpass filters 214 and 218 of the left channel to provide a correspondingly varying direct current bias across the load resistor 221, which correspondingly controls the audio output of the left-channel control amplifier V-10, V-11. The 35- and 40-cycle control signals produce corresponding voltages across load resistors 222 and 223 for controlling the respective center and right channel amplifiers V-12, V-13 and V-14, V-15. In this way, the outputs of the respective left, center and right speakers are caused to have amplitudes corresponding to the amplitudes of the respective control carriers. During the production of the record or motion picture film sound track, these control carrier amplitudes are adjusted to have values which will produce the desired directional effects of the stereophonic type from three separated speakers and in this way the required perspective sound effects are produced with a single audio signal and single sound track.

It will be appreciated that any undesired variations in the amplitudes of the control carriers should be avoided in order to maintain the proper relationship and degree of control of the control amplifier outputs. For this reason, the band-pass filters should have as good flat-top characteristics as possible and the limit of ½ db down plus or minus one cycle from the center frequency has been determined to be the maximum tolerable as a practical matter. In addition, however, an undesired effect may be produced by intermodulation between the control tones themselves, which may be caused by insufficient attenuation of the bandpass filters or incidental cross-coupling in the power supplies or the like. This produces a wavering effect on the direct current bias appearing across the rectifier load resistors which, in the illustrative example given above, would waver at a 5-cycle rate producing an undesirable pulsation or "breathing" of the output audio signals.

According to one important feature of the present invention, this effect is obviated by providing a delay circuit such that the control amplifiers cannot respond to fluctuations of control potential occurring at as rapid a rate as 5 cycles per second. This means that fluctuations in the direct current bias occurring more sharply than at a rate corresponding to 5 cycles per second are eliminated and rendered ineffective to affect the control amplifiers. This not only avoids the 5-cycle effect, but also eliminates "bloops" or the like which may be caused by noise pulses, or scratches or dirt on the sound track in the case of optical recording.

Such a delay circuit is formed by the resistors and condensers shown at 236 in the upper or left channel. These resistors and condensers are selected to have a total time constant of at least one-quarter second and preferably are chosen to have a time constant of approximately one-half second, and thereby prevent the undesired 5-cycle fluctuation or noise-responsive fluctuation of the control amplifier output. Similar delay circuits 237 and 238 are provided for the other channels. Their time delays are at least as long as the reciprocal of the lowest frequency to be made ineffective.

These delay circuits also have the effect of delaying the control bias applied to the control amplifiers with respect to the audio signal. The delay interposed may be of the order of 600 milliseconds which is added to the delays produced by the filter sections 214 and 218, which may be of the order of 35 milliseconds. The effect of this delay is to retard the application of control to the audio signal. For example, a sudden change from left speaker to right speaker is thereby delayed by over ½ second, which may be quite noticeable.

To avoid such effects, according to another feature of the invention, a special process is followed in making the final record. A recording of the audio program alone is first made, and that program is thereafter reproduced while simultaneously the control carrier amplitudes are manually adjusted to provide proper directional shift of the apparent source of the reproduced sound. As the control carriers are varied, a recording is made of their amplitudes. Thereafter the two recordings, of the audio program and of the control carriers, are re-recorded upon a single record which is the final recording, such as the optical sound track of a motion picture. In this re-recording step, to correct the time delays just mentioned, the control carrier recording is advanced relative to the audio program recording by an amount which, at the established speed of playback, or pickup, corresponds to substantially the required time delay compensation. Thus, for a standard motion picture projection of 24 frames per second of 35 mm. film, the film moves 18 inches per second. For a time delay of about ⅔ second such as indicated above, the control carrier record is advanced about 12 to 16 frames (9 to 12 inches) relative to the corresponding audio program record during re-recording, and thereby overcomes this undesired delay.

The present invention also provides means for automatically overcoming another undesirable situation which could arise under special conditions of operation of the present system. For example, in some situations there may be an interval of time during which the center speaker alone is operative. This may correspond, for example, to a sequence in a motion picture in which all of the action, such as dialogue, is confined to the center location of the screen. This sequence may be followed by another sequence where the action is distributed across the entire screen, such as, for example, where background sound effects occur. In the production of the original master record or sound track, the original audio program recording has dialogue components and sound effects components (which sometimes may be combined with a musical background). In producing the final master record, these two audio signal components are mixed and are then supplied to the optical sound track recorder. The levels of these signals are appropriately adjusted for the desired recording level for each one and, for example, they may have the same level. These levels are thus fixed during this re-recording. When proceeding from the situation where the center speaker alone is effective, to one where all speakers are effective, where the signal level of the complete audio program does not change, normally the sound energy is substantially trebled, because three speakers become effective instead of the previous single speaker. This produces a sudden blasting which is undesirable. This is avoided in the present invention by providing deliberately poor regulation in the power supply 209 which supplies the plate potentials for the various tubes. By way of illustration, this plate supply may produce a voltage of from 275 to 300 volts at no load. This power supply is deliberately given internal impedance so that at full load the voltage will deliberately drop by at least 20 volts. This degree of regulation is designated herein as "poor regulation." The effect of such poor regulation is that, under the circumstances outlined above, as the three control amplifiers suddenly impress a demand for trebled energy on the power supply, the power supply voltage drops to prevent all that energy from being supplied to the control amplifiers. As a result, the three control amplifiers are then energized at lower levels than the previous level of the single center-channel amplifier, even without a change in audio signal or a change in control signal, and the result is gradual transition from single speaker operation to three-speaker operation. The effect of this poor regulation is to tend to maintain constant total energy from all three channels, for a given bias condition on the control amplifiers, and thereby to permit full freedom of directional sound effects without requiring compensating amplitude changes. In this way, during the recording process, the control carriers may be adjusted merely to vary the direction of the apparent sound source, without being concerned about whether one, two or three speakers are in operation and without requiring manual compensation for changes in number of speakers in operation.

This arragement also has advantage in connection with the auto-switching circuit described hereinbelow, which, upon failure or absence of control carriers, automatically switches the system over to the center speaker alone, and, similarly, when the control carriers appear, automatically activates all three control amplifiers to energize all three speakers instead of just the one. By means of this poor regulation of the power supply, this shift between one and three loudspeakers in going between the flat and stereophonic reproduction conditions, results in little if any change in total energy sound level and avoids the necessity of an operator's readjustment of the reproduction level each time a reel or film section is played without control signals after one with such signals, or vice versa.

As indicated above, the present invention provides a fully compatible system in which films produced according to the invention may be reproduced either normally on a single speaker in theaters not equipped with the present apparatus or stereophonically by a plurality of speakers when so equipped. Likewise, standard films which do not have the required control carriers may be reproduced by use of the present equipment in the same manner as they would be reproduced by the conventional equipment, since by the auto-switching circuit now to be described the absence of control carriers automatically switches the system to a single (preferably central) loudspeaker.

It will be appreciated that at the output of each of the second section filters 218, 219 and 220 and just before the respective rectifiers V-7, V-8, V-9, there appears a signal of the carrier frequency and with an amplitude corresponding to the amplitude of the originally recorded control tone. A resistor 261 is coupled in each channel to the output of the second filter section, by connection to one anode of the rectifier, and these three resistors 261 are connected together and through a coupling condenser 262 to the input of a cathode follower amplifier stage formed by the right section of tube V-3. A variable control potentiometer 263 is provided in the input of this cathode follower amplifier stage V-3 right, to permit adjustment of the level at which auto-switching occurs. A switch 259 is provided for short-circuiting the input to the cathode follower amplifier stage V-3 right, for disabling the auto-switch circuit and thereby causing the system to operate continuously with flat sound reproduction, as on the center channel alone. The resultant low impedance output of this amplifier V-3 right is supplied to a voltage-doubler rectifier formed by a pair of rectifiers 264 having a load resistor 265 shunted by condenser 266, whereby there is produced across the resistor 265 a direct voltage corresponding to the sum of the amplitudes of the three control carriers. The voltage across resistor 265 is impressed on the input of a control tube formed by the right section of tube V-2, whose anode is coupled through a resistor 267 to plate supply source 209. A condenser 268 is coupled between this anode and ground. The voltage across condenser 268 is impressed on the input of a second control tube formed by the left section of tube V-3, having the winding of relay 234 in its cathode circuit.

The operation of this auto-switch circuit is as follows: During the continuous presence of the control carriers, a voltage appears across resistor 265 of a magnitude corresponding to the sum of the amplitude of the control carriers, and is of a polarity and is adjusted by control 263 to be of a magnitude sufficient to cut off the first control tube, V-2 right, thereby raising the potential of its anode to correspondingly charge up condenser 268 and to render the control grid of the left section of V-3 highly positive, causing cathode current to flow therein to energize relay 234 and attract its three variable contacts downward.

When the three relay contacts are thus attracted downward, the control biases across the rectifier load resistors 221, 222, 223 are supplied to the respective control amplifiers to provide stereophonic operation.

It will be understood that so long as stereophonic operation is desired, there will be a signal supplied by the right section of V-3 to the rectifiers 264, since at least one of the control carriers is present during normal stereophonic operation. Potentiometer 263 provides an adjustable control for the bias across resistor 265 and sets the minimum control carrier level for which stereophonic operation may occur. Should all the control carriers disappear, as may be the case if a section of film not having any control carriers is spliced into a stereophonic film, then the voltage built up across resistor 265 will decay at a rate determined by the time constant of resistor 265 and condenser 266, correspondingly varying the bias on the right section of V-2. An instant is then reached at which the right section of V-2 reaches cut-off and begins to conduct, after a time delay determined by this time constant.

As V-2 right begins to conduct, its anode potential is depressed, and condenser 268 discharges through V-2 right, thereby reducing the potential on the grid of V-2 left. This action continues at a rate determined by the various time constants, until condenser 268 reaches a low enough voltage value to cut-off V-2 left, which thereby de-energizes relay 234. This in turn causes the movable relay contacts to move upward to their upper positions. In the upper position of top relay contact, it connects the fixed negative potential of source 225 to the grids of control amplifier tubes V-10 and V-11, which is sufficient to cut them off entirely. The same is true for the right channel control tubes V-14, V-15 which are cut off by the bias from source 225 applied through the bottom relay contacts in upper (deenergized) position. However, for the center channel, the middle contacts of relay 234 connect the grids of control amplifier tubes V-12, V-13 to the bias source 226. This source has a value permitting normal amplification by tubes V-12 and V-13.

Accordingly, when the control carriers diminish in total level below a value determined by potentiometer 263, relay 234 deenergizes to disable the left and right speakers and to apply fixed bias to the center channel amplifier, to permit normal operation by it independent of all control carrier amplitudes. Of course, any or all of the channels may be thus switched over to independent operation or be cut off, as may be desired.

In order to allow for momentary periods of silence on the screen, when control carrier levels may be very low or to allow for errors in splicing or the like, the time delay for deenergizing the relay 234 is made to have a value of approximately 1½ seconds. This time delay is of course made up of the time constant of resistor 265 and condenser 266, the time constant of condenser 268 and the internal resistance of V-2 right, and the relay drop-out time.

Upon reoccurrence of the control carriers, a resultant control carrier voltage appears at once in the output circuit of the right section of V-3 which is rectified by the rectifiers 264, providing a control voltage across resistor 265, and the right section of V-2 is cut off. Upon such cutting off, however, the potential of its anode does not immediately jump up to full plate potential, since current will continue to flow through the load resistor 268 until condenser 267 is charged up from its low residual value to the full value of source 209. The time constant of resistor 268 and condenser 267 is purposely made quite high, of the order of 20 seconds, so that a substantial period of time will pass before the potential on the grid of the left section V-3 rises to a value sufficient to permit cathode current to flow. This period may be of the order of 7 seconds in order to make sure that stray signals appearing in the system such as, for example, by dust on the sound track or noise passing the bandpass filters will not accidentally shift the system from flat to stereophonic sound. The time constant is made much longer than the actual delay period, so that substantially only the linear part of the condenser charging curve is used, yielding readily determinable cut-off conditions for V-3 left. In this way, the system requires the continual existence of control carriers for a period of, say 7 seconds, to automatically switch from flat to stereophonic sound.

To assure proper stereophonic reproduction, each separate reel or film section made according to the present invention is provided with a sound-track leader in advance of the initial frames, that leader having a sound track of substantially 168 frames (10½ feet) or more, with control carriers recorded thereon, so as to assure that the circuit is properly conditioned for stereophonic operation as soon as the first photographed frame of the film is projected.

Means are thus provided for automatically converting from flat to stereophonic sound, and conversely, depending solely upon the presence or absence of control carriers and without the intermediary of any operator. In addition, the poor regulation feature discussed above assures that there is no abrupt transition or change in sound energy upon the actuation of the relay 234, since when changing from one channel to three or from three to one, the regulation of the power supply tends to prevent large change in total sound energy.

It will be understood that, although described particularly above in connection with sound motion pictures, the present invention may equally well be used in any sound reproducing system where perspective or stereophonic effects are desired.

Accordingly, the present invention has provided a system for producing perspective sound effects by the use of a plurality of spatially separated reproducers, each supplied with the same audio signal and individually controlled as to output amplitude by control signals recorded together with the audio signal upon a single sound track, the system being completely compatible with its recordings being usable with conventional single-channel sound reproducing systems without requiring any adaptation, modification or conversion.

It will be understood that many variations of the above illustrative systems are possible without departing from the spirit of the present invention. Thus, any desired types of amplifier, filters, rectifiers, relay-control circuits or adjustable-gain circuits may be used, as convenient, in place of those indicated above.

Also, in place of making a recording of the composite control plus audio signal and then reproducing it, that composite signal may be transmitted directly to a reproducer system, as by wire or radio links, to give perspective sound at a distance substantially simultaneously with the creation of the program.

Also, in place of control signals of different frequencies, adjustable in amplitude, these signals may be either of different frequencies, adjustable in phase, or of different phase, adjustable in amplitude, or of different amplitudes, adjustable in frequency or phase, so long as in each case they are separable and a variable control effect can be derived therefrom.

It will be understood that the above description is illustrative only, and many equivalent circuits or portions of circuits may be substituted therein without departing from the spirit or scope of the invention.

I claim as the invention:

1. A recording and reproducing system for producing perspective sound effects, comprising a source of audio intelligence signal, a plurality of control frequency signal generators, each producing a control signal of a respectively different frequency, means for combining said audio and control signals into a composite signal, a recording medium having a single recording track, means for recording said composite signal upon said medium, a single pickup adapted to derive from said recording medium electrical signals representative of the signals supplied to said recorder and having audio signal and control signal components, means for separating said composite signal into separate audio signals and separate control signals, a plurality of spatially segregated sound reproducers, a respective controllable-gain amplifier coupled to the input of each of said reproducers, means identically supplying said separate audio signal to all said amplifiers and means for controlling the output of each of said reproducers in correspondence with the amplitude of a respective separate control signal, the amplitudes of said control signals being adjusted in accordance with desired respective amplitudes of sound from said reproducers, whereby perspective sound effects may be produced from said recording medium.

2. A recording and reproducing system for producing perspective sound effects, comprising a source of audio intelligence signal, a plurality of control frequency signal generators, each producing a control signal of a respectively different frequency, a recording medium having a single track, means for recording said audio and control signals on said medium track, a single pickup adapted to derive from said recording medium electrical signals representative of the signals supplied to said recorder and having audio signal and control signal components, a plurality of spatially segregated sound reproducers, a respective controllable-gain amplifier coupled to the input of each of said reproducers, means identically supplying said audio signal to all said amplifiers, and means for controlling the output of each of said reproducers in correspondence with the amplitude of a respective control signal, the amplitudes of said control signals being adjusted in accordance with desired respective amplitudes of sound from said reproducers, whereby perspective sound effects may be produced from said recording medium.

References Cited in the file of this patent

UNITED STATES PATENTS

| | | |
|---|---|---|
| 1,811,839 | Arnold | June 30, 1931 |
| 2,098,561 | Beers | Nov. 9, 1937 |
| 2,298,618 | Garity et al. | Oct. 13, 1942 |
| 2,313,867 | Garity et al. | Mar. 16, 1943 |
| 2,322,435 | Goshaw | June 22, 1943 |
| 2,361,490 | Mueller | Oct. 31, 1944 |